Jan. 19, 1971   F. G. WEIGHART   3,555,889

ULTRASONIC INSPECTION APPARATUS

Filed June 7, 1967

Frederick G. Weighart,
INVENTOR.
BY.

ATTORNEY.

United States Patent Office 3,555,889
Patented Jan. 19, 1971

3,555,889
ULTRASONIC INSPECTION APPARATUS
Frederick G. Weighart, Brookfield, Conn., assignor to Automation Industries, Inc., Los Angeles, Calif., a corporation of California
Filed June 7, 1967, Ser. No. 644,196
Int. Cl. G01n 29/04
U.S. Cl. 73—67.9                                                 2 Claims

ABSTRACT OF THE DISCLOSURE

A plurality of transducers are adapted to be coupled to a workpiece at a plurality of different locations. All transducers are simultaneously energized by a transmitter and sequentially gated to a receiver.

---

The present invention relates to nondestructive testers wherein ultrasonic energy is transmitted into workpieces to locate defects. In the present embodiments of the tester a large number of separate ultrasonic transducers are provided for simultaneously inspecting a single workpiece at a corresponding number of different locations or simultaneously inspecting a corresponding large number of similar workpieces whereby a high speed inspection can be made. The system includes a large number of transducers together with a novel form of multiplexing whereby common transmitting, and receiving means may be employed for monitoring the test results at the different locations.

BACKGROUND OF THE INVENTION

When utilizing an ultrasonic tester for inspecting a workpiece a transducer is acoustically coupled to the workpiece whereby ultrasonic energy is transmitted into the workpiece. The same transducer or a second transducer receives the ultrasonic energy after it has propagated through the workpiece. Heretofore it has been necessary to employ a separate transmitter and receiver for each of the transducers. The transducers inherently have a relatively narrow beam pattern and therefore cover a very small area. If a large workpiece is to be completely covered it has been necessary to inspect the workpiece in a series of successive inspections, or to use a plurality of similar test systems for simultaneously inspecting the workpiece at a plurality of different locations. This has been very slow and expensive.

SUMMARY

The present invention provides means for overcoming the foregoing difficulties. More particularly the present invention provides a simple and efficient ultrasonic tester for simultaneously inspecting a single workpiece at a plurality of different locations, or for simultaneously inspecting a plurality of different workpieces. In the limited number of embodiments disclosed herein this is accomplished by providing a plurality of separate transducers which may be coupled to the workpiece at a plurality of different locations to be inspected. The transducers are, in turn, coupled to a single transmitter, receiver and output means by a time sharing multiplexer. The multiplexer includes a plurality of gates that are opened and closed in a predetermined sequence whereby the receiver effectively responds to the individual transducers so that each of the independent locations are individually inspected independent from the other locations.

DESCRIPTION OF THE DRAWINGS

These and other features and advantages of the present invention will become readily apparent from the detailed description of a limited number of embodiments thereof, particularly when taken in connection with the accompanying drawings wherein like reference numerals refer to like parts and wherein.

DETAILED DESCRIPTION OF THE DRAWINGS

Figure 1:
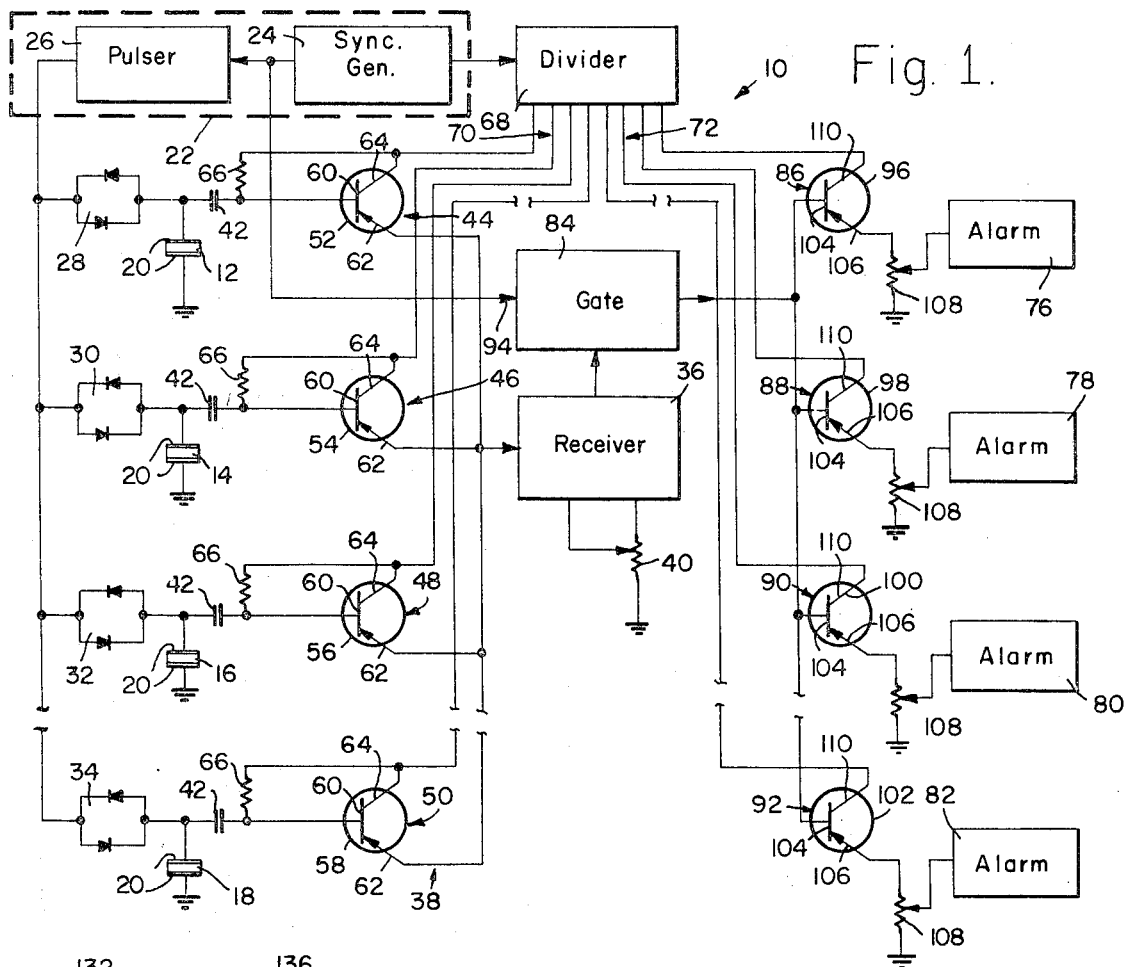
FIG. 1 is a combination schematic block diagram of a system embodying one form of the present invention.

Referring to the drawings in more detail and particularly to FIG. 1, the present invention is especially adapted for use in a nondestructive tester 10 for simultaneously inspecting a workpiece at a plurality of different locations. Alternatively the tester 10 may be employed for simultaneously inspecting a plurality of separate but siimlar workpieces.

Separate transducer means are provided for each of the locations or each of the workpieces to be simultaneously inspected. Although the transducer means may be of any desired variety this tester operates in a so-called pulse-echo mode wherein each of the transducer means includes a single transducer 12, 14, 16 and 18 effective to both transmit and receive the ultrasonic energy.

Each of the present transducers includes a device such as a piezoelectric crystal having electrode surfaces 20 on the opposite sides thereof. When an electrical driving signal is applied to the electrodes 20 the crystal physically vibrates and radiates or transmits ultrasonic energy. Conversely, when ultrasonic energy is incident upon the crystal an electric potential is developed between the two electrodes 20. This is a R.F. signal which corresponds in amplitude, shape and time to the incident ultrasonic energy.

The transducers 12, 14, 16 and 18 may be acoustically coupled to the workpiece (not shown in FIG. 1) or workpieces at a plurality of predetermined fixed locations. However, they are normally arranged to scan along a particular path which extends over the surface of the workpiece. As a result the workpiece will be simultaneously inspected over a large number of paths whereby even large workpieces may be very rapidly inspected.

The transducers 12, 14, 16 and 18 are energized by electric driving signals developed in transmitter means 22. A continuous driving signal may be applied to the transducers 12, 14, 16 and 18 whereby they will continuously transmit ultrasonic energy. However, in the present instance it is desired to only intermittently transmit pulses of ultrasonic energy. Accordingly the transmitter means includes a clock or sync generator 24. This generator 24 is normally a free running circuit such as a multivibrator and produces a series of timing pulses. These pulses control the repetition rate of the entire system. This is generally on the order of a few kilocycles.

A pulse generator or pulser 26 is coupled to the sync generator 24 so as to be responsive to the timing pulses. The pulser 26 is coupled to the transducers 12, 14, 16 and 18 and produces driving signals which simultaneously energize all of the transducers 12, 14, 16 and 18. Normally this signal is a pulse with an amplitude of several hundred volts. It normally is of very short duration (a few cycles) and has a high frequency (from less than 0.25 megacycle up to 25 megacycles or higher).

The pulser 26 is coupled to each of the transducers by separate pairs 28, 30, 32 and 34 of reversed diodes. The driving signal is on the order of several hundred volts and the breakdown voltage of the diodes is only a few volts. Accordingly, the driving signal passes freely through one or the other or both of the diodes and excites all of the transducers simultaneously.

The voltage of the R.F. signals generated by the transducers 12, 14, 16 and 18, as a result of receiving ultrasonic energy, is normally relatively low, for example a few millivolts or less. The diodes are selected such that their conducting voltage exceeds the voltages of the R.F. signals whereby any R.F. signals developed within a transducer will be blocked by the diodes. As a result no returning R.F. signals will ever be coupled to the pulser 26 or to any of the other transducers.

As previously described, the transducers 12, 14, 16 and 18 are coupled to the surface of a single workpiece at a plurality of locations which are to be inspected, or to a large number of similar workpieces to be simultaneously inspected. In the present embodiment only four transducers 12, 14, 16 and 18 are shown to represent a series with an undisclosed number of transducers. However it should be understood any number of transducers, including a very large number may be employed.

The various transducers are effective to transmit pulses of ultrasonic energy into the workpiece each time the sync generator 24 produces a timing pulse. If there is a discontinuity in the path of the transmitted energy at least a portion of the energy is reflected back to the transducer 12, 14, 16, and 18. When the transducer receives this energy it produces a corresponding R.F. signal.

Normally the workpiece is free of any internal discontinuities and the first received echo corresponds to the energy reflected from the opposite surface of the workpiece. The resultant R.F. signal will, therefore, normally be delayed from the transmitting signal by a time corresponding to the distance from the transducer to the back surface and return, i.e. it is a function of the thickness of the workpiece. In the event there is a discontinuity such as a void, crack etc. between the front and back surfaces, at least a portion of the energy is reflected and received before the echo from the back surface. The resultant R.F. signal now includes a pulse occurring at a time which corresponds to the distances from the transducer to the discontinuity, i.e. its depth below the entrant surface. By measuring the time delay between the transmitted pulse and the first returning echo it is possible to measure the thickness of the workpiece and/or to determine the presence of any internal discontinuities of their depth below the surface.

All of the transducers 12, 14, 16 and 18 are coupled to a common receiver 36. In the present instance this is accomplished by separate coupling means 38 for each of the transducers 12, 14, 16 and 18. The receiver 36 is effective to receive the R.F. signals generated by the transducers as a result of incident ultrasonic energy. The receiver 36 provides on its output a signal having a waveform corresponding to the envelope of the R.F. signal. The gain of the receiver 36 and the amplitude of the R.F. signal is controlled by the setting of the potentiometer 40.

The received signal includes one or more pulses delayed from the transmission of the initial ultrasonic energy by an interval (or intervals) corresponding to the distance (or distances) from the transducer to the reflecting surface (or surfaces). If the workpiece is free from any discontinuities the time delay is a function of the thickness of the workpiece. If there is a discontinuity between the front and back surfaces the time delay will be a function of the depth of the discontinuity below the surface.

Each of the present coupling means 38 includes a capacitor 42 and a gate 44, 46, 48 and 50. Each gate 44, 46, 48 and 50 includes a transistor 52, 54, 56 and 58 arranged as an emitter follower. More particularly the base 60 of each transducer is connected to the respective capacitor 42. The emitters 62 are all directly coupled to each other and the common input of the receiver 36. The collector 64 of each transistor 52, 54, 56 and 58 is connected to the base 60 by a biasing resistor 66.

In addition each collector 64 is coupled to a gate control. The present gate control includes a counter or divider 68 having a sync input coupled to the output of the sync generator 24. The divider 68 also includes a plurality of separate outputs. In the present instance there are two groups 70 and 72 with each group including a separate output for each transducer. Each time a timing pulse is applied to the input a signal is produced on the next successive output. It will be seen the divider 68 in effect separates, or divides, the timing pulses up to into four separate signal trains. The signals in each train have a frequency which, in this embodiment, is one quarter that of the driving pulses. The various outputs of the divider 68 are coupled to the collectors 64 of the various transistors 52, 54, 56 and 58. Normally the collector 64 is biased to cut-off the transistor whereby no R.F. signal reaches the emitter 62. However, when an output signal is present on one of the outputs of divider 68 the corresponding transistor is turned "ON" for an interval corresponding to the duration of the output signal. Any R.F. signals produced by the associated transducer during this interval is coupled to the receiver 36.

When the next sync pulse occurs the signal on the output terminates, the previously conductive transducer becomes non-conductive whereby its gate closes, a signal appears on the next output and the next successive transistor becomes conductive whereby its gate opens.

It will thus be seen that although all of the transducers 12, 14, 16 and 18 are simultaneously energized and transmit pulses of ultrasonic energy into the workpiece at all of the locations, only one of the gates 44, 46, 48 and 50 will be open and the gate which is opened rotates in sequence. As a result of this multiplexing arrangement the R.F. signals from the various transducers 12, 14, 16 and 18 are sequentially coupled to the receiver 36.

The output of the receiver 36 may be coupled to any suitable utilizing means. The type of utilizing means to be employed is, of course, dependent upon the nature of the workpiece, the type of test or inspection to be made, the type of information desired and what use is to be made of the information, etc. By way of example the present tester 10 includes a separate alarm 76, 78, 80 and 82 for each of the transducers 12, 14, 16 and 18. However, meters, paint sprays, recorders, etc. may be used instead or in combination with the alarms.

In the event a transducer 12, 14, 16 or 18 is scanning a portion of the workpiece containing a defect the appropriate alarm 76, 78, 80 or 82 will indicate this fact. The alarms 76, 78, 80 and 82 are coupled to the output of the receiver 36 by means of a first gate 84 in series with the receiver 36 and a series of parallel output gates 86, 88, 90 and 92 disposed between the output of the first gate 84 and the inputs of the alarms 76, 78, 80 and 82.

The first gate 84 includes a control input 94 which is coupled to the output of the sync generator 24 so as to be in synchronism with the transmission of the ultrasonic energy. This gate 84 is effective to open for a predetermined interval following each transmission of the pulses from the transducers 12, 14, 16 and 18 and to remain open for a predetermined time interval. The open interval corresponds to the time during which an R.F. signal would occur as a result of a reflecting target being disposed at a range which is of particular interest.

For example, the tester 10 may be employed for locating defects disposed inside of the workpiece or for detecting excessive thinness. The gate 84 would then open at a time corresponding to the ultrasonic energy entering the workpiece and would close at a time corresponding to a reflection from the thinnest acceptable workpiece. If a discontinuity is present inside of the workpiece or if the workpiece is too thin an echo will be received while the gate 84 is still open. This signal will then be coupled to the input of the gates 86, 88, 90 and 92. If the workpiece is free of defects and/or is of acceptable thickness no signals occur while the gate 84 is open.

Conversely it may be desirable to employ the tester for monitoring the workpiece for excessive thickness. In this event the gate 84 would remain closed for a period which is equal to the time corresponding to the maximum acceptable thickness.

The output gates 86, 88, 90 and 92 may be similar to the input gates 44, 46, 48 and 50 and include transistors 96, 98, 100 and 102. The bases 104 of all the transistors 96, 98, 100 and 102 are coupled directly to the common output of the gate 84. Each of the emitters 196 are coupled to ground by individual potentiometers 108. The collectors 110 are connected to the second group 72 of outputs from the divider 68. This will cause each of the output gates 86, 88, 90 and 92 to open and close in synchronism with the corresponding input gates 44, 46, 48 and 50 respectively. As a consequence the input gates 44, 46, 48 and 50 and the output gates 86, 88, 90 and 92 in effect divide the tester 10 up into a plurality of channels corresponding to the paths scanned by the transducers 12, 14, 16 and 18 and the characteristics of the workpiece along each scan path is independently indicated by the alarms 76, 78, 80 and 82.

In order to utilize this tester 10 for inspecting a workpiece, the transducers 12, 14, 16 and 18 are coupled to the workpiece so as to scan the areas of interest. The sync generator 24 intermittently generates a triggering pulse whereby the pulser 26 produces a driving pulse. This driving pulse is coupled through the diode pairs 28, 30, 32 and 34 to all of the transducers 12, 14, 16 and 18 whereby they all simultaneously transmit ultrasonic energy into the workpiece. At this instant all of the input gates 44, 46, 48 and 50 are normally closed whereby the driving pulse is prevented from reaching the receiver 36.

Any returning echoes are received by the transducers 12, 14, 16 and 18 and R.F. signals are produced. By the time the R.F. signals of interest are returned one of the input gates 44, 46, 48 or 50 will have opened. The rest of the gates will be closed. The R.F. signal will then be coupled through the open gate to the receiver 36. If a signal occurs when the gate 84 is open it will be coupled to all of the bases 104 of the transistors 96, 98, 100 and 102 in the gates 86, 88, 90 and 92. The output gate corresponding to the open input gate will be open whereby the received signal is coupled to the alarm, etc. If there are any objectionable discontinuities in this channel an indication will be provided.

When the next succeeding timing pulse occurs the divider 68 will open the next succeeding input and output gates whereby that channel will indicate the characteristics of the portion of the workpiece being scanned by the associated transducer. The various potentiometers 108 are adjusted so that the characteristics of the channels are all essentially the same. The potentiometer 40 is set to make the receiver 36 gain proper for the desired indications, i.e. alarm levels etc.

It will thus be seen all portions of the workpiece will be simultaneously and continuously inspected. However the tester employs only a single transmitter and a single receiver.

Figure 2:
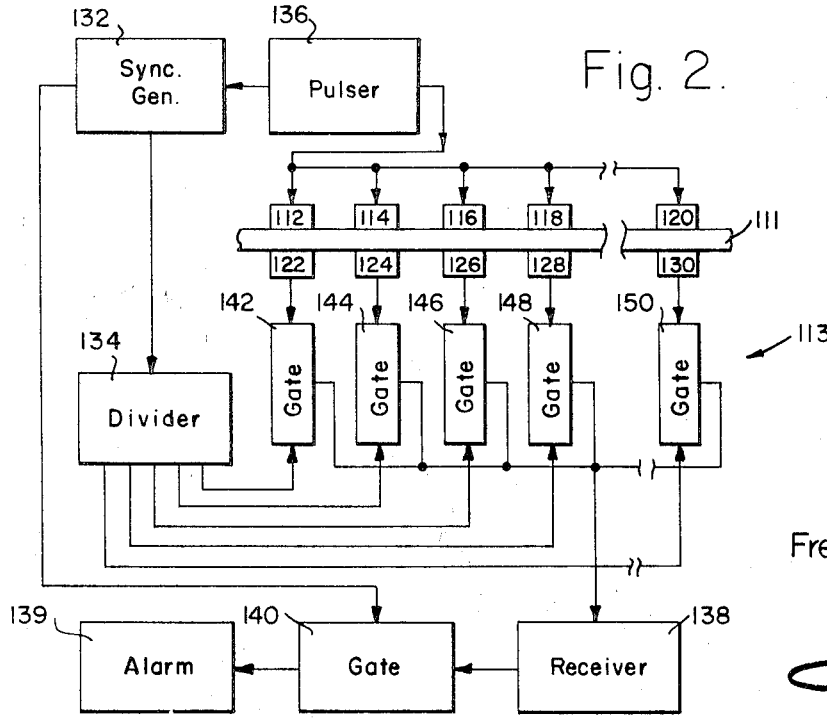
FIG. 2 is a block diagram of a second system embodying another form of the present invention.

As an alternative it may be desirable to employ the tester 113 of FIG. 2. This tester 113 is very similar to the preceding tester 10 in that it includes a large number of transducer means for inspecting a workpiece 111 at a large number of different locations. However, in this embodiment each transducer means includes a single transducer 112, 114, 116, 118 and 120 for transmitting ultrasonic energy and a separate transducer 122, 124, 126, 128 and 130 for receiving the ultrasonic energy.

The transducers in each pair are placed on the opposite sides of the workpiece 111 whereby ultrasonic energy may be transmitted from the first transducer through the workpiece to the second transducer. If the workpiece is free of any discontinuities the energy will pass through the workpiece. In the event of a discontinuity, such as a crack, void, etc. the ultrasonic energy will be absorbed, reflected, etc. and will not reach the receiving transducer.

A sync generator 132 and pulser 136 are provided for energizing all of the transmitting transducers 112 to 120 whereby the pulses of ultrasonic energy to be simultaneously transmitted through the workpiece 111 at all of the different locations.

Each of the receiving transducers 122 to 130 is coupled to a separate gate 142, 144, 146, 148 and 150, a signal input, a control input and a signal output. Normally each gate 142 to 150 is maintained closed whereby no signals are coupled from the signal input to the signal output. However, when a control signal is present on the control input the gate opens. Any signals present on the input during the control signal are coupled directly through the gate 142 to 150 to the signal output.

A divider 134 or counter is connected to the sync generator 132. This is effective to divide the trigger pulses into separate series of signals. The signals in the various series are delayed by amounts corresponding to the successively occurring timing signals. The outputs of the divider 134 are coupled to the various gates 142 to 150. As a consequence each time a trigger signal occurs the next succeeding gate opens and couples the signals from the respective receiving transducer 122 to 130 to the common output.

A receiver 138 is coupled to the common outputs of the gates 142 to 150 and is effective to receive the various gated signals. The receiver 138 is in turn coupled to suitable output means. In the present instance this includes a gate 140 coupled to the sync generator 132. The output of the gate 140 is in turn coupled to suitable indicating means. Although this may include a recorder, meter, etc. it is again shown as an alarm 139.

During the operation of this system 113 each time a trigger pulse occurs the pulser 136 energizes all of the transmitting transducers 112, 114, 116, 118 and 120 whereby ultrasonic energy is coupled through the workpiece 111 to each of the receiving transducers 122, 124, 126, 128 and 130. The divider 134 is effective to maintain all of the gates 142 to 150 except one closed. If the transducer associated with the open gate receives a pulse of ultrasonic energy an R.F. signal is coupled through the open gate to the receiver 138. As the successive timing signals occur the successive gates 142 to 150 will open and close whereby the R.F. signals in the channels will be received.

The received signals are coupled through the gate 140 to the alarm 139 which is a threshold circuit arranged to alarm on a loss of a signal below a settable level. In the event a signal is received by the receiver 138 it will be coupled through the gate 140 and the alarm 139 will not go off. This indicates that portion of the workpiece 111 is sound and free of any discontinuities. However, in the event a signal is not received no signal is coupled through the gate 140 and the alarm 139 will be set off, thereby indicating there is a discontinuity within the workpiece 111 aligned with one pair of transducers.

While only a limited number of embodiments of the present invention are disclosed herein it will be readily apparent to persons skilled in the art that numerous changes and modifications may be made thereto without departing from the spirit of the invention. More particularly the various arrangements of the transducers and whether they operate in a pulse echo, through transmission or other mode may be varied. In fact, it is contemplated that the transducers may be arranged to simultaneously inspect the same part of the workpiece by transmitting the ultrasonic energy in several different directions or modes, which it operates may be modified to suit any particular requirement. Moreover the output means may be adapted to satisfy the requirements of any situation. For example, the alarms may be replaced or supplemented by an indicating meter, oscilloscope, markers, recorders, etc.

I claim:
1. An ultrasonic nondestructive tester for inspecting a workpiece at a plurality of different locations, said tester including the combination of
a plurality of transducers including a separate transducer for each of the locations, said transducers being adapted to be acoustically coupled to the workpiece along a predetermined path,
means for electrically isolating each transducer of said plurality from one another, a transmitter coupled to each said transducer and being adapted to simultaneously energize all transducers, a receiver for receiving electrical signals generated by said transducers, a first gating means being coupled between said transducers and said receiver and including a separate gate for each transducer, utilization circuitry including a separate utilization circuit responsive to said receiver, a second gating means coupled between said transducer and said utilization circuitry and including a separate gate coupled between said receiver and each said utilization circuit, and timing means operatively coupled to said first and said second gating means and being effective to open corresponding said first and said second gates of said first and said second gating means for simultaneously energizing corresponding transducers and corresponding utilization circuits in the predetermined sequence.

2. The tester as defined in claim 1 wherein said timing means includes a pulser in said transmitter for simultaneously energizing said transducers whereby the transducers simultaneously propagate ultrasonic energy into the workpiece, and a multiplexer responsive to said pulser and being effective to open and close said gates in said first gating means and said second gating means.

References Cited

UNITED STATES PATENTS

| | | | |
|---|---|---|---|
| 3,021,706 | 2/1962 | Cook et al. | 73—67.8 |
| 3,052,115 | 9/1962 | Renaut et al. | 73—67.5 |
| 3,228,233 | 1/1966 | Keldenich | 73—67.8 |
| 3,373,602 | 3/1968 | Wendt et al. | 73—67.5 |
| 3,380,293 | 4/1968 | Murphy | 73—67.7 |

RICHARD C. QUEISSER, Primary Examiner

J. P. BEAUCHAMP, Assistant Examiner

U.S. Cl. X.R.

73—67.5